(12) United States Patent
Tsuyuki (10) Patent No.: US 12,478,333 B2
(45) Date of Patent: Nov. 25, 2025

(54) X-RAY CT APPARATUS, CORRECTION DATA COLLECTION METHOD, AND STORAGE MEDIUM

(71) Applicant: CANON MEDICAL SYSTEMS CORPORATION, Otawara (JP)

(72) Inventor: Masaharu Tsuyuki, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 242 days.

(21) Appl. No.: 18/328,861

(22) Filed: Jun. 5, 2023

(65) Prior Publication Data

US 2023/0404493 A1 Dec. 21, 2023

(30) Foreign Application Priority Data

Jun. 16, 2022 (JP) ................. 2022-097404

(51) Int. Cl.
| | |
|---|---|
| A61B 6/00 | (2024.01) |
| A61B 6/03 | (2006.01) |
| A61B 6/42 | (2024.01) |
| G06T 11/00 | (2006.01) |
| A61B 6/40 | (2024.01) |

(52) U.S. Cl.
CPC ............ *A61B 6/035* (2013.01); *A61B 6/4241* (2013.01); *G06T 11/005* (2013.01); *A61B 6/4035* (2013.01)

(58) Field of Classification Search
CPC ............................ A61B 6/032; G01T 11/005
See application file for complete search history.

(56) References Cited

U.S. PATENT DOCUMENTS

2020/0323502 A1* 10/2020 Kojima ................ A61B 6/025

FOREIGN PATENT DOCUMENTS

JP 2018-42604 A 3/2018

* cited by examiner

*Primary Examiner* — Dani Fox
(74) *Attorney, Agent, or Firm* — Oblon, McClelland, Maier & Neustadt, L.L.P.

(57) ABSTRACT

An X-ray CT apparatus of an embodiment includes a rotating unit and processing circuitry. The rotating unit is configured to rotatably hold the X-ray tube and the X-ray detector. The processing circuitry is configured to switch energy bin sets related to discrimination of photons detected by the X-ray detector between a first energy bin set and a second energy bin set in which at least a part of an energy bin combination is different from the first energy bin set during one rotation of the rotating unit and collect correction data for each of the first energy bin set and the second energy bin set during one rotation in response to switching between the first energy bin set and the second energy bin set.

9 Claims, 10 Drawing Sheets

X-RAY CT APPARATUS, CORRECTION DATA COLLECTION METHOD, AND STORAGE MEDIUM

CROSS-REFERENCE TO RELATED APPLICATION

The present application claims priority based on Japanese Patent Application No. 2022-097404 filed Jun. 16, 2022, the content of which is incorporated herein by reference.

FIELD

Embodiments disclosed in the present specification and drawings relate to an X-ray CT apparatus, a correction data collection method, and a storage medium.

BACKGROUND

A photon counting computed tomography (CT) apparatus is an imaging diagnostic apparatus capable of discriminating an inspection target substance through which X-rays have passed using a direct detector such as a semiconductor detector with a high energy resolution. In the photon counting CT apparatus, it is necessary to collect correction data for calibration while changing a threshold of an energy band (hereinafter also referred to as an "energy bin") prior to main scanning.

Correction data is collected by setting a combination (threshold set) of thresholds of a plurality of energy bins to certain values and then radiating X-rays while rotating an X-ray tube and an X-ray detector once. Therefore, as the number of target threshold sets increases, it takes more time to collect correction data.

DETAILED DESCRIPTION

Hereinafter, an X-ray CT apparatus, a correction data collection method, and a storage medium according to embodiments will be described with reference to the drawings. The X-ray CT apparatus of an embodiment is a photon counting CT apparatus. A photon-counting CT apparatus discriminates an inspection target substance through which X-rays have passed using a direct detector. Unlike conventional X-ray CT apparatuses using an indirect transducer in which phosphors such as scintillators and a photodetector are combined, the photon counting CT apparatus collects calibration data (hereinafter referred to as "correction data") of a substance discrimination phantom (reference substance). In the X-ray CT apparatus of the present embodiment, at the time of collecting such correction data, a time required to collect correction data is reduced by changing a threshold of an energy bin for each angle while rotating an X-ray tube and an X-ray detector once.

An X-ray CT apparatus of an embodiment includes a rotating unit and processing circuitry. The rotating unit is configured to rotatably hold an X-ray tube and an X-ray detector. The processing circuitry is configured to switch energy bin sets related to discrimination of photons detected by the X-ray detector between a first energy bin set and a second energy bin set in which at least a part of an energy bin combination is different from the first energy bin set during one rotation of the rotating unit and collect correction data for each of the first energy bin set and the second energy bin set during one rotation in response to switching between the first energy bin set and the second energy bin set.

First Embodiment

[Configuration of X-Ray CT Apparatus]

Figure 1:
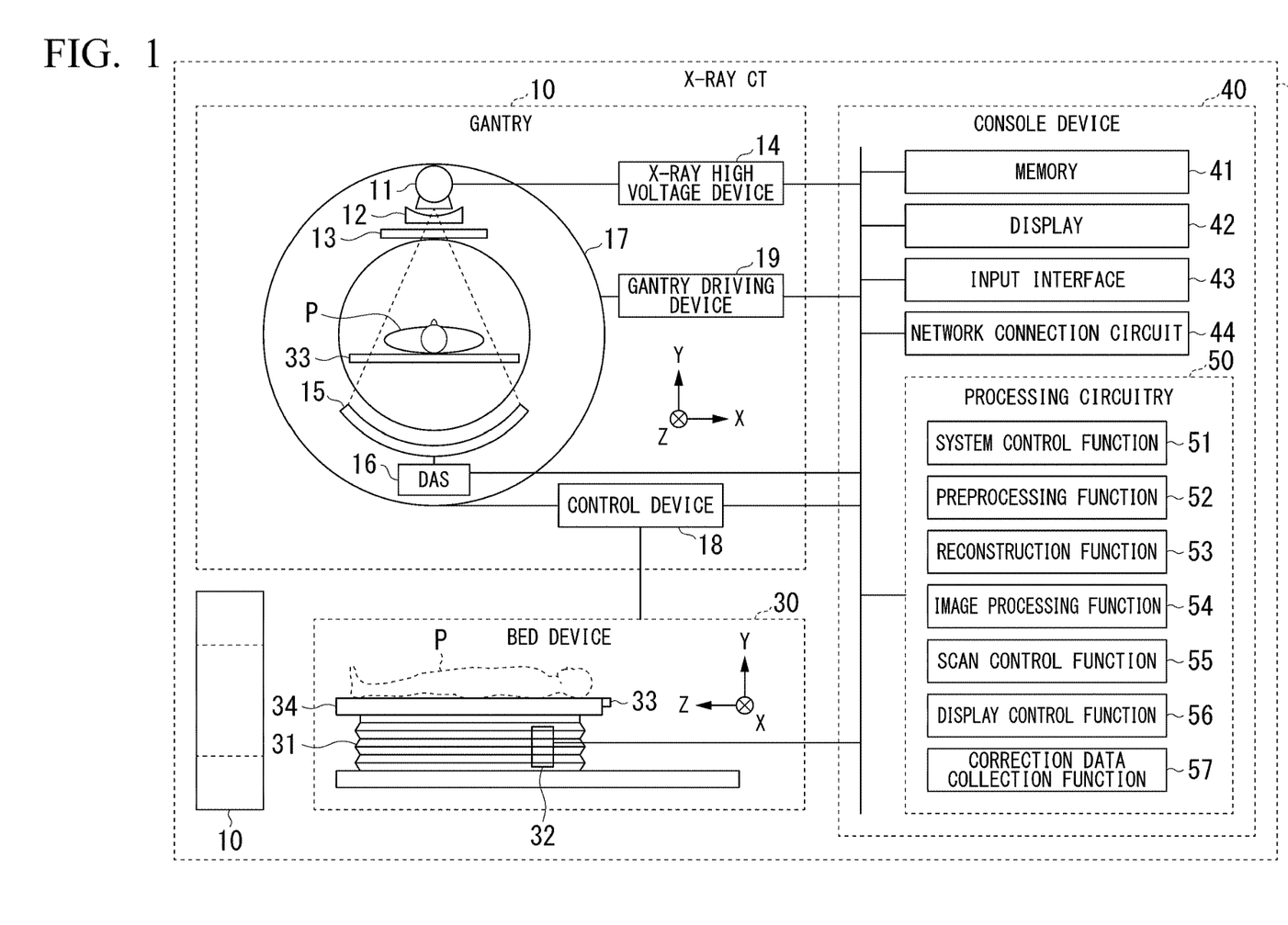
FIG. 1 is a diagram showing an example of an X-ray CT apparatus 1 according to a first embodiment.

FIG. 1 is a diagram showing an example of an X-ray CT apparatus 1 according to a first embodiment. The X-ray CT apparatus 1 includes, for example, a gantry 10, a bed device 30, and a console device 40. Although FIG. 1 shows both a diagram of the gantry 10 viewed in the Z-axis direction and a diagram of the gantry 10 viewed in the X-axis direction for convenience of description, there is one gantry 10 in practice. In the first embodiment, a rotation axis of a rotating frame 17 in a non-tilt state or the longitudinal direction of a top plate 33 of the bed device 30 is defined as the Z-axis direction, an axis orthogonal to the Z-axis direction and horizontal to the floor surface is defined as the X-axis direction, and a direction orthogonal to the Z-axis direction and perpendicular to the floor surface is defined as the Y-axis direction.

The gantry 10 includes, for example, an X-ray tube 11, a wedge 12, a collimator 13, an X-ray high voltage device 14, an X-ray detector 15, and a data acquisition system (DAS) 16, the rotating frame 17, a control device 18, and a gantry driving device 19. The rotating frame 17 is an example of a "rotating unit" in the claims. That is, the rotating frame 17 rotatably holds the X-ray tube 11 and the X-ray detector 15.

The X-ray tube 11 generates X-rays by radiating thermal electrons from a cathode (filament) to an anode (target) according to application of a high voltage from the X-ray high voltage device 14. The X-ray tube 11 includes a vacuum tube. For example, the X-ray tube 11 is a rotating anode type X-ray tube that generates X-rays by radiating thermal electrons to a rotating anode.

The wedge 12 is a filter for adjusting the dose of X-rays radiated from the X-ray tube 11 to a subject P. The wedge 12 attenuates X-rays passing through the wedge 12 such that the distribution of the dose of X-rays radiated from the X-ray tube 11 to the subject P becomes a predetermined distribution. The wedge 12 is also called a wedge filter or a bow-tie filter. The wedge 12 is formed, for example, by processing aluminum to have a predetermined target angle and a predetermined thickness.

The collimator 13 is a mechanism for narrowing down a radiation range of X-rays that have passed through the wedge 12. The collimator 13 narrows down the radiation range of X-rays by combining a plurality of lead plates to form a slit, for example. The collimator 13 may be called an X-ray diaphragm. A narrowing range of the collimator 13 may be mechanically driven.

The X-ray high voltage device 14 includes, for example, a high voltage generation device (not shown) and an X-ray control device (not shown). The high voltage generation device has an electrical circuit including a transformer, a rectifier, and the like and generates a high voltage to be applied to the X-ray tube 11. The X-ray control device controls an output voltage of the high voltage generation device in accordance with a dose of X-rays to be generated by the X-ray tube 11. The high voltage generation device may boost a voltage using the transformer described above or boost the voltage using an inverter. The X-ray high voltage device 14 may be provided on the rotating frame 17 or may be provided on the side of a fixed frame (not shown) of the gantry 10.

The X-ray detector 15 detects the intensity of X-rays generated by the X-ray tube 11 and incident through the subject P. The X-ray detector 15 outputs an electrical signal (which may be an optical signal or the like) corresponding to the detected intensity of X-rays to the DAS 16. The X-ray detector 15 has, for example, a plurality of X-ray detection element arrays. Each of the plurality of X-ray detection element arrays has a plurality of X-ray detection elements arranged in a channel direction along an arc having a focal point of the X-ray tube 11 as a center. The plurality of X-ray detection element arrays are arranged in a slice direction (column direction or row direction).

The X-ray detector 15 is, for example, a direct detection type detector. As the X-ray detector 15, for example, a semiconductor diode having electrodes attached to both ends of a semiconductor can be applied. X-ray photons incident on the semiconductor are converted into electron-hole pairs. The number of electron-hole pairs generated according to incidence of one X-ray photon depends on the energy of the incident X-ray photons. Electrons and holes are attracted to a pair of electrodes formed at both ends of the semiconductor. A pair of electrodes generates an electric pulse having a peak value corresponding to charge of electron-hole pairs. A single electric pulse has a peak value corresponding to the energy of incident X-ray photons.

The DAS 16 collects count data indicating a count number of X-ray photons detected by the X-ray detector 15 with respect to a plurality of energy bins according to a control signal from the control device 18, for example. The count data with respect to the plurality of energy bins corresponds to an energy spectrum with respect to X-rays incident on the X-ray detector 15 modified according to the response characteristics of the X-ray detector 15. The DAS 16 outputs detection data based on digital signals to the console device 40. The detection data is a digital value of the count data identified by a channel number and a row number of an X-ray detection element that is a generation source, and a view number indicating a collected view. A view number is a number that changes according to rotation of the rotating frame 17 and, for example, is a number that is incremented according to rotation of the rotating frame 17. Therefore, the view number is information indicating a rotation angle of the X-ray tube 11. A view period is a period that falls between a rotation angle corresponding to a certain view number and a rotation angle corresponding to the next view number. The DAS 16 may detect switching of views according to a timing signal input from the control device 18, an internal timer, or a signal obtained from a sensor that is not shown. When X-rays are continuously emitted from the X-ray tube 11 during full scanning, the DAS 16 collects detection data groups for the entire circumference (for 360 degrees). When X-rays are continuously emitted from the X-ray tube 11 during half scanning, the DAS 16 collects detection data for a half circumference (180 degrees).

Figure 2:
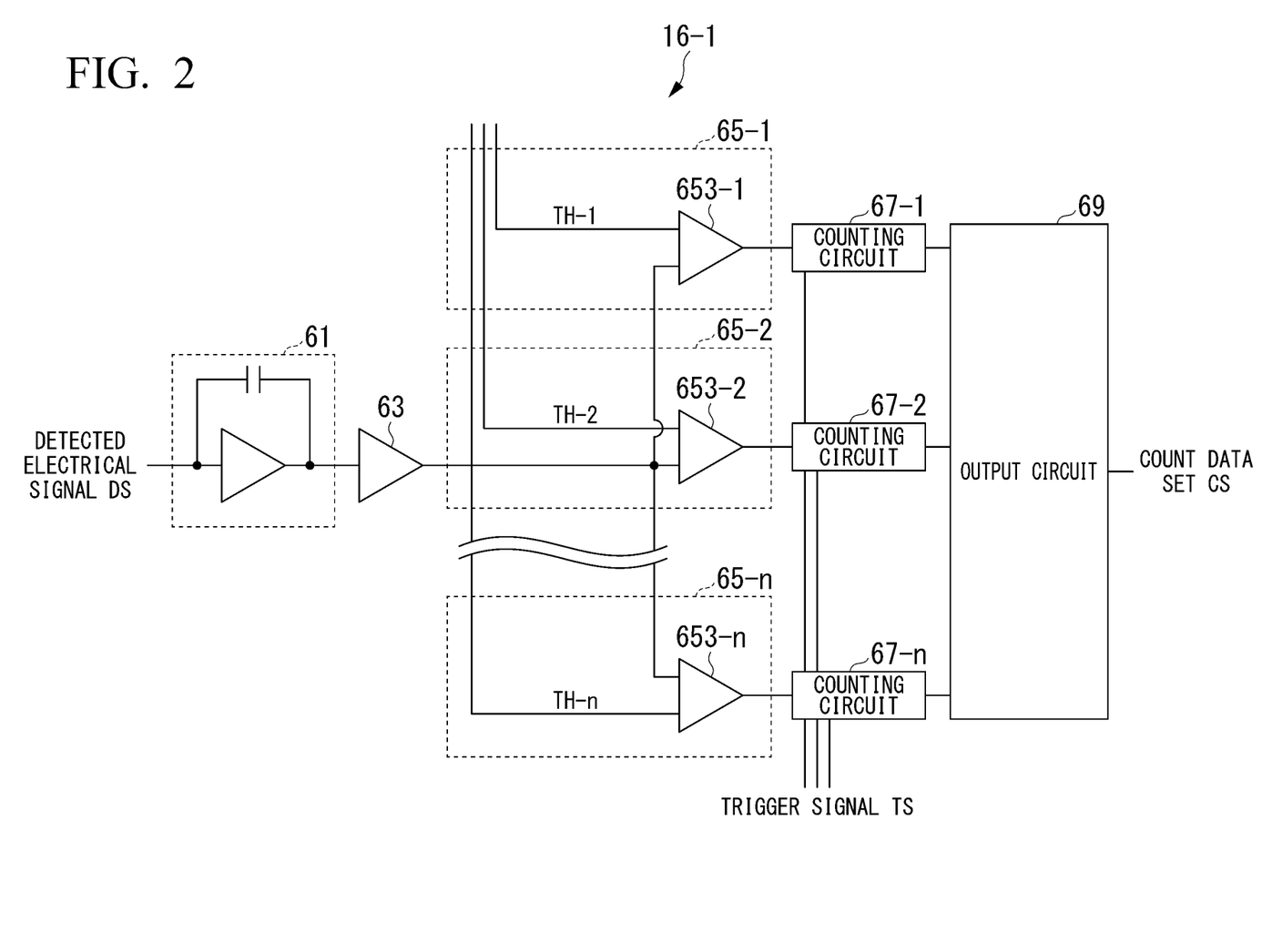
FIG. 2 is a diagram showing an example of a configuration of a DAS 16 according to the first embodiment.

FIG. 2 is a diagram showing an example of the configuration of the DAS 16 according to the first embodiment. The DAS 16 includes readout channels corresponding to the number of X-ray detection elements. These readout channels are implemented in parallel on an integrated circuit, such as an application specific integrated circuit (ASIC). FIG. 2 shows only the configuration of a DAS 16-1 for one readout channel.

The DAS 16-1 includes a preamplifier circuit 61, a waveform shaping circuit 63, a plurality of peak discrimination circuits 65, a plurality of counting circuits 67, and an output circuit 69. The preamplifier circuit 61 amplifies a detected electrical signal DS (current signal) from an X-ray detection element to which it is connected. For example, the preamplifier circuit 61 converts a current signal from the X-ray detection element to which it is connected into a voltage signal having a voltage value (peak value) proportional to the charge amount of the current signal. The waveform shaping circuit 63 is connected to the preamplifier circuit 61. The waveform shaping circuit 63 shapes the waveform of the voltage signal from the preamplifier circuit 61. For example, the waveform shaping circuit 63 reduces the pulse width of the voltage signal from preamplifier circuit 61.

A plurality of counting channels corresponding to the number of energy bands (energy bins) are connected to the waveform shaping circuit 63. When n energy bins are set, the waveform shaping circuit 63 is provided with n counting channels. Each counting channel has a peak discrimination circuit 65-$n$ and a counting circuit 67-$n$.

Each peak discrimination circuits 65-$n$ discriminates the energy of X-ray photons detected by the X-ray detection element, which is a peak value of a voltage signal from the waveform shaping circuit 63. For example, the peak discrimination circuit 65-$n$ includes a comparison circuit 653-$n$. A voltage signal from the waveform shaping circuit 63 is input to one input terminal of each comparison circuit 653-$n$. A reference signal TH (reference voltage value) corresponding to a different threshold is supplied from the control device 18 to the other input terminal of each comparison circuit 653-$n$. For example, a reference signal TH-1 is supplied to a comparison circuit 653-1 for an energy bin bin1, a reference signal TH-2 is supplied to a comparison circuit 653-2 for an energy bin bin2, and a reference signal TH-$n$ is supplied to a comparison circuit 653-$n$ for an energy bin binn. Each reference signal TH has an upper limit reference value and a lower limit reference value. Each comparison circuit 653-$n$ outputs an electrical pulse signal when the voltage signal from the waveform shaping circuit 63 has a peak value corresponding to the energy bin corresponding to each reference signal TH. For example, when the peak value of the voltage signal from the waveform shaping circuit 63 is a peak value corresponding to the energy bin bin1 (when it falls between the reference signals TH-1 and TH-2), the comparison circuit 653-1 outputs an electrical pulse signal. On the other hand, the comparison circuit 653-1 for the energy bin bin1 outputs no electrical pulse signal when the peak value of the voltage signal from the waveform shaping circuit 63 is not a peak value corresponding to the energy bin bin1. Further, when the peak value of the voltage signal from the waveform shaping circuit 63 is a peak value corresponding to the energy bin bin2 (when it falls between the reference signals TH-2 and TH-3), for example, the comparison circuit 653-2 outputs an electrical pulse signal.

The counting circuit 67-$n$ counts electrical pulse signals from the peak discrimination circuit 65-$n$ at a read cycle that matches a view switching cycle. For example, the counting circuit 67-$n$ is supplied with a trigger signal TS from the control device 18 at each view switching timing. The counting circuit 67-$n$ adds 1 to a count number stored in an internal memory each time an electrical pulse signal is input from the peak discrimination circuit 65-$n$ by being triggered by supply of the trigger signal TS. The counting circuit 67-$n$ reads count number data (that is, count data) stored in the internal memory and supplies the count data to the output circuit 69 by being triggered by supply of the next trigger signal. Further, the counting circuit 67-$n$ resets the count number accumulated in the internal memory to an initial value each time the trigger signal TS is supplied. In this manner, the counting circuit 67-$n$ counts the count number for each view.

The output circuit 69 is connected to counting circuits 67-$n$ corresponding to a plurality of readout channels mounted on the X-ray detector 15. The output circuit 69 integrates count data from the counting circuits 67-$n$ corresponding to the plurality of readout channels to generate count data for the plurality of readout channels for each view with respect to each of a plurality of energy bins. Count data of each energy bin is a set of count number data defined by a channel, a segment (column), and an energy bin. The count data of each energy bin is transmitted to the console device 40 on a view-by-view basis. Count data for each view is called a count data set CS.

The rotating frame 17 is an annular member that supports the X-ray tube 11, the wedge 12, the collimator 13, and the X-ray detector 15 such that they face each other. The rotating frame 17 is rotatably supported by the fixed frame around the subject P introduced therein. The rotating frame 17 also supports the DAS 16. Detection data output by the DAS 16 is transmitted from a transmitter having a light emitting diode (LED) provided in the rotating frame 17 to a receiver having a photodiode provided in a non-rotating unit (e.g., fixed frame) of the gantry 10 through optical communication, and forwarded to the console device 40 by the receiver. A method of transmitting the detection data from the rotating frame 17 to the non-rotating unit is not limited to the above-described method using optical communication, and any non-contact transmission method may be employed. The rotating frame 17 is not limited to an annular member, and may be a member such as an arm as long as it can support and rotate the X-ray tube 11 and the like.

The X-ray CT apparatus 1 is, for example, a Rotate/Rotate-type X-ray CT apparatus (third generation CT) in which both the X-ray tube 11 and the X-ray detector 15 are supported by the rotating frame 17 and rotate around the subject P, but it is not limited thereto and may be a Stationary/Rotate-Type X-ray CT apparatus (fourth generation CT) in which a plurality of X-ray detection elements arranged in an annular shape are fixed to a fixed frame and the X-ray tube 11 rotates around the subject P.

The control device 18 includes, for example, processing circuitry having a processor such as a central processing unit (CPU). The control device 18 receives an input signal from an input interface attached to the console device 40 or the gantry 10 and controls operations of the gantry 10, the bed device 30, and the DAS 16. For example, the control device 18 controls the gantry driving device 19 to rotate the rotating frame 17 or tilt the gantry 10. At the time of tilting the gantry 10, the control device 18 controls the gantry driving device 19 on the basis of an inclination angle (tilt angle) input to the input interface to rotate the rotating frame 17 around an axis parallel to the Z-axis direction. The control device 18 ascertains the rotation angle of the rotating frame 17 according to the output of a sensor which is not shown, or the like. In addition, the control device 18 provides the rotation angle of the rotating frame 17 to a scan control function 55 and a correction data collection function 57 at any time. The control device 18 also controls energy bins (reference signal TH) of the DAS 16. The control device 18 may be provided in the gantry 10 or may be provided in the console device 40.

The gantry driving device 19 includes, for example, a motor and an actuator. The gantry driving device 19 rotates the rotating frame 17 or tilts the gantry 10, for example. The gantry driving device 19 rotates the rotating frame 17 of the gantry 10 on the basis of an inclination angle (tilt angle) input to the input interface and a rotation instruction from the correction data collection function 57, which will be described later.

The bed device 30 is a device on which the subject P to be scanned is placed, moved, and introduced into the rotating frame 17 of the gantry 10. The bed device 30 includes, for example, a base 31, a bed driving device 32, a top plate 33, and a support frame 34. The base 31 includes a housing that supports the support frame 34 such that the support frame 34 is movable in the vertical direction (Y-axis direction). The bed driving device 32 includes a motor and an actuator. The bed driving device 32 moves the top plate 33 along the support frame 34 in the longitudinal direction (Z-axis direction) of the top plate 33. The bed driving device 32 also moves the top plate 33 in the vertical direction (Y-axis direction). The top plate 33 is a plate-shaped member on which the subject P is placed.

The bed driving device 32 may move not only the top plate 33 but also the support frame 34 in the longitudinal direction of the top plate 33. Contrary to the above, the gantry 10 may be movable in the Z-axis direction, and the rotating frame 17 may be controlled to come around the subject P by moving the gantry 10. Moreover, both the gantry 10 and the top plate 33 may be configured to be movable. Further, the X-ray CT apparatus 1 may be an apparatus in which the subject P is scanned in a standing or sitting position. In this case, the X-ray CT apparatus 1 has a subject support mechanism in place of the bed device 30, and the gantry 10 rotates the rotating frame 17 in an axial direction perpendicular to the floor surface.

The console device 40 includes, for example, a memory 41, a display 42, an input interface 43, a network connection circuit 44, and processing circuitry 50. Although the console device 40 is described as being separate from the gantry 10 in the first embodiment, the gantry 10 may include some or all of the components of the console device 40.

The memory 41 is realized by, for example, a semiconductor memory element such as a random access memory (RAM) or a flash memory, a hard disk, an optical disc, or the like. The memory 41 stores, for example, detection data, projection data, reconstructed image data, CT image data, information on the subject P, imaging conditions, correction data collection conditions, and the like. The memory 41 stores count data regarding a plurality of energy bins transmitted from the gantry 10, for example. Such data may be stored in an external memory with which the X-ray CT apparatus 1 can communicate, instead of the memory 41 (or in addition to the memory 41). The external memory is controlled by a cloud server, for example, when the cloud server that manages the external memory receives a read/write request.

The display 42 displays various types of information. For example, the display 42 displays medical images (CT images) generated by the processing circuitry, graphical user interface (GUI) images for receiving various operations by an operator such as a doctor or an engineer, and the like. The display 42 is, for example, a liquid crystal display, a cathode ray tube (CRT), an organic electroluminescence (EL) display, or the like. The display 42 may be provided on the gantry 10. The display 42 may be of a desktop type, or may be a display device (for example, a tablet terminal) capable of wireless communication with the main body of the console device 40.

The input interface 43 receives various input operations by an operator and outputs an electrical signal indicating the content of a received input operation to the processing circuitry 50. For example, the input interface 43 receives operation of inputting collection conditions for collecting detection data or projection data (which will be described later), reconstruction conditions for reconstructing CT images, image processing conditions for generating post-processed images from CT images, an instruction to start correction data collection processing and setting of collection conditions. For example, the input interface 43 is realized by a mouse, a keyboard, a touch panel, a trackball, a switch, a button, a joystick, a camera, an infrared sensor, a microphone, or the like. The input interface 43 may be provided on the gantry 10. Further, the input interface 43 may be realized by a display device (for example, a tablet terminal) capable of wireless communication with the main body of the console device 40. In this specification, the input interface is not limited to those having physical operation parts such as a mouse and a keyboard. For example, examples of the input interface include electrical signal processing circuitry that receives an electrical signal corresponding to an input operation from an external input device provided separately from the apparatus and outputs the electrical signal to a control circuit.

The network connection circuit 44 includes, for example, a network card having a printed circuit board, or a wireless communication module. The network connection circuit 44 implements an information communication protocol according to a form of a network to be connected.

The processing circuitry 50 controls the overall operation of the X-ray CT apparatus 1, operation of the gantry 10, operation of the bed device 30, and a calibration operation for collecting correction data. The processing circuitry 50 executes, for example, a system control function 51, a preprocessing function 52, a reconstruction function 53, an image processing function 54, a scan control function 55, a display control function 56, a correction data collection function 57, and the like. These components are realized by, for example, a hardware processor (computer) executing a program (software) stored in the memory 41. The hardware processor is, for example, circuitry such as a CPU, a graphics processing unit (GPU), an application specific integrated circuit (ASIC), a programmable logic device (e.g., a simple programmable logic device (SPLD), a composite programmable logic device (CPLD), or a field programmable gate array (FPGA)). The program may be directly embedded in the circuitry of the hardware processor instead of being stored in the memory 41. In this case, the hardware processor realizes the function thereof by reading and executing the program embedded in the circuitry. The hardware processor is not limited to being configured as a single circuit, and may be configured as one hardware processor by combining a plurality of independent circuits to implement each function. Further, a plurality of components may be integrated into one hardware processor to realize each function.

Each component of the console device 40 or the processing circuitry 50 may be distributed and realized by a plurality of pieces of hardware. The processing circuitry 50 may be realized by a processing device that can communicate with the console device 40 instead of a component included in the console device 40. The processing device is, for example, a workstation connected to one X-ray CT apparatus, or a device (e.g., a cloud server) that is connected to a plurality of X-ray CT apparatuses and collectively executes processing equivalent to that of the processing circuitry 50 which will be described below.

The system control function 51 controls various functions of the processing circuitry 50 on the basis of input operation received by the input interface 43.

The preprocessing function 52 performs preprocessing such as offset correction processing, inter-channel sensitivity correction processing, and beam hardening correction on detection data output from the DAS 16.

Figure 3:
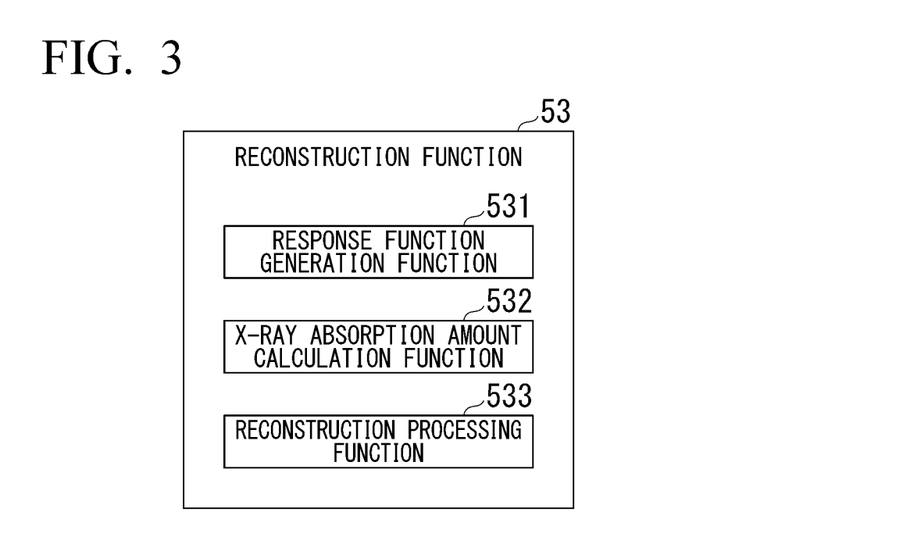
FIG. 3 is a diagram showing an example of functional blocks of a reconstruction function 53 according to the first embodiment.

The reconstruction function 53 reconstructs a photon counting CT image of the subject P on the basis of detection data (count data). FIG. 3 is a diagram showing an example of functional blocks of the reconstruction function 53 according to the first embodiment. The reconstruction function 53 includes, for example, a response function generation function 531, an X-ray absorption amount calculation function 532, and a reconstruction processing function 533. The response function generation function 531 generates response function data representing detector response characteristics. For example, the response function generation function 531 measures a response (i.e., detected energy and detected intensity) of a standard detection system to a plurality of monochromatic X-rays having a plurality of incident X-ray energies by performing predictive calculations, experiments, and a combination of predictive calculations and experiments thereon and generates a response function on the basis of the measured values of detected energy and detected intensity. Further, the response function generation function 531 may generate data of the response function on the basis of actual measured values collected in calibration or the like. The response function defines a relationship between a detected energy for each incident x-ray and an output response of the system. For example, the response function defines a relationship between a detected energy and a detected intensity for each incident x-ray. The generated data of the response function is stored in the memory 41.

The X-ray absorption amount calculation function 532 calculates the amount of X-ray absorption for each of a plurality of base substances on the basis of count data regarding a plurality of energy bins, the energy spectrum of X-rays incident on the subject P, and the response function stored in the memory 41. The X-ray absorption amount calculation function 532 can calculate the amount of X-ray absorption without the influence on the response characteristics of the X-ray detector 15 and the DAS 16 by calculating the amount of X-ray absorption on the basis of the count data and the energy spectrum of the X-rays incident on the subject P using the response function. Processing of obtaining the amount of X-ray absorption for each base substance in this manner is also called substance discrimination. Any substance such as calcium, calcification, bone, fat, muscle, air, organ, lesion, hard tissue, soft tissue, and contrast medium can be set as a base substance. The type of a base substance to be calculated may be determined in advance by an operator or the like via the input interface 43. The amount of X-ray absorption indicates the amount of X-rays absorbed by a base substance. For example, the amount of X-ray absorption is defined by a combination of an X-ray attenuation coefficient and an X-ray transmission path length.

The reconstruction processing function 533 reconstructs a photon counting CT image representing a spatial distribution of a basis substance to be imaged among the plurality of base substances on the basis of the amount of X-ray absorption for each of the plurality of base substances calculated by the X-ray absorption amount calculation function 532 and stores the generated CT image data in the memory 41. The base substance to be imaged may be of one type or of a plurality of types. The type of the base substance to be imaged may be determined by an operator or the like via the input interface 43.

Referring back to FIG. 1, the image processing function 54 converts the CT image data into three-dimensional image data or cross-sectional image data having an arbitrary cross section through a known method on the basis of an input operation received by the input interface 43. Conversion to three-dimensional image data may be performed by the preprocessing function 52.

The scan control function 55 controls detection data collection processing in the gantry 10 by instructing the X-ray high voltage device 14, the DAS 16, the control device 18, the gantry driving device 19, and the bed driving device 32. The scan control function 55 controls operation of each part at the time of capturing positioning images and capturing images used for diagnosis.

The display control function 56 causes the display 42 to display various images (captured images, positioning images, results of input operation received by the input interface 43, and the like).

Figure 4:
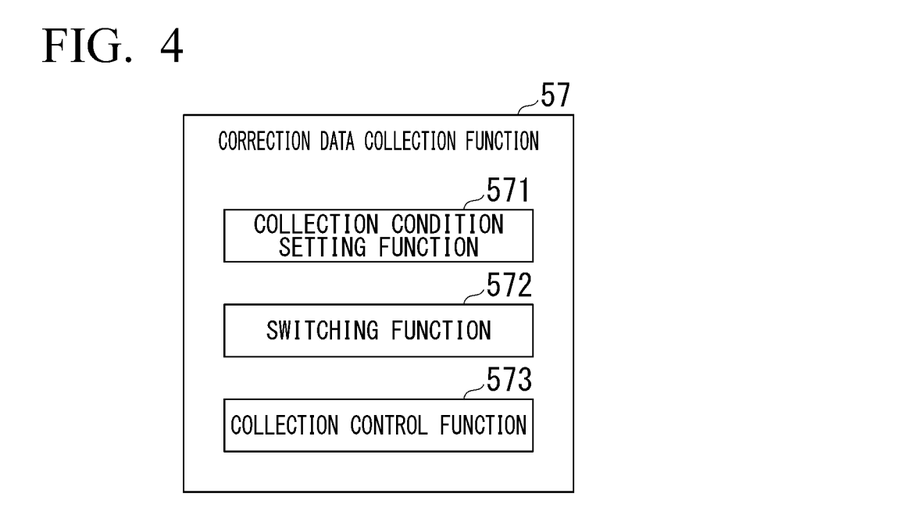
FIG. 4 is a diagram showing an example of functional blocks of a correction data collection function 57 according to the first embodiment.

The correction data collection function 57 controls a calibration operation for collecting correction data. The correction data collection function 57 controls the control device 18. FIG. 4 is a diagram showing an example of functional blocks of the correction data collection function 57 according to the first embodiment. The correction data collection function 57 has, for example, a collection condition setting function 571, a switching function 572, and a collection control function 573.

The collection condition setting function 571 sets correction data collection conditions on the basis of predetermined collection conditions stored in the memory 41 or an input operation received by the input interface 43. The collection condition setting function 571 sets a combination of energy bin thresholds (threshold set or energy bin set) for each angle (angle range) during rotation of the X-ray tube and the X-ray detector one to several times. The collection condition setting function 571 may set imaging parameters such as a focal size, a focal position, a tube voltage, a tube current, a DAS gain, a slit aperture width, and a DAS bundling unit as collection conditions in addition to energy bin thresholds. The collection condition setting function 571 may also set substances (water phantom, air, and other substances) to be irradiated with X-rays at the time of collecting correction data as the collection conditions. Details of processing of the collection condition setting function 571 will be described later.

The switching function 572 switches threshold sets while the X-ray tube and the X-ray detector rotate once on the basis of the collection conditions (switching conditions) set by the collection condition setting function 571. The switching function 572 is an example of a "switch" in the claims. That is, the switching function 572 switches an energy bin set related to discrimination of photons detected by the X-ray detector 15 between the first energy bin set and the second energy bin set in which at least a part of combinations of energy bins is different from the first energy bin set while the rotating unit (rotating frame 17) rotates once. Details of processing of the switching function 572 will be described later.

The collection control function 573 performs control for collecting correction data under threshold set conditions switched by the switching function 572. The collection control function 573 is an example of a "collection controller" in the claims. That is, the collection control function 573 collects correction data of each of the first energy bin set and the second energy bin set while the rotating unit (rotating frame 17) rotates once in response to switching between the first energy bin set and the second energy bin set. Details of processing of the collection control function 573 will be described later.

According to the above configuration, the X-ray CT apparatus 1 scans the subject P in scan modes such as helical scanning, conventional scanning, and step-and-shoot. Helical scanning is a mode in which the subject P is helically scanned by rotating the rotating frame 17 while moving the top plate 33. Conventional scanning is a mode in which the subject P is scanned in a circular orbit by rotating the rotating frame 17 with the top plate 33 stationary. Step-and-shoot is a mode in which the position of the top plate 33 is moved at regular intervals to perform conventional scanning in a plurality of scan areas.

[Processing Flow]

Figure 5:
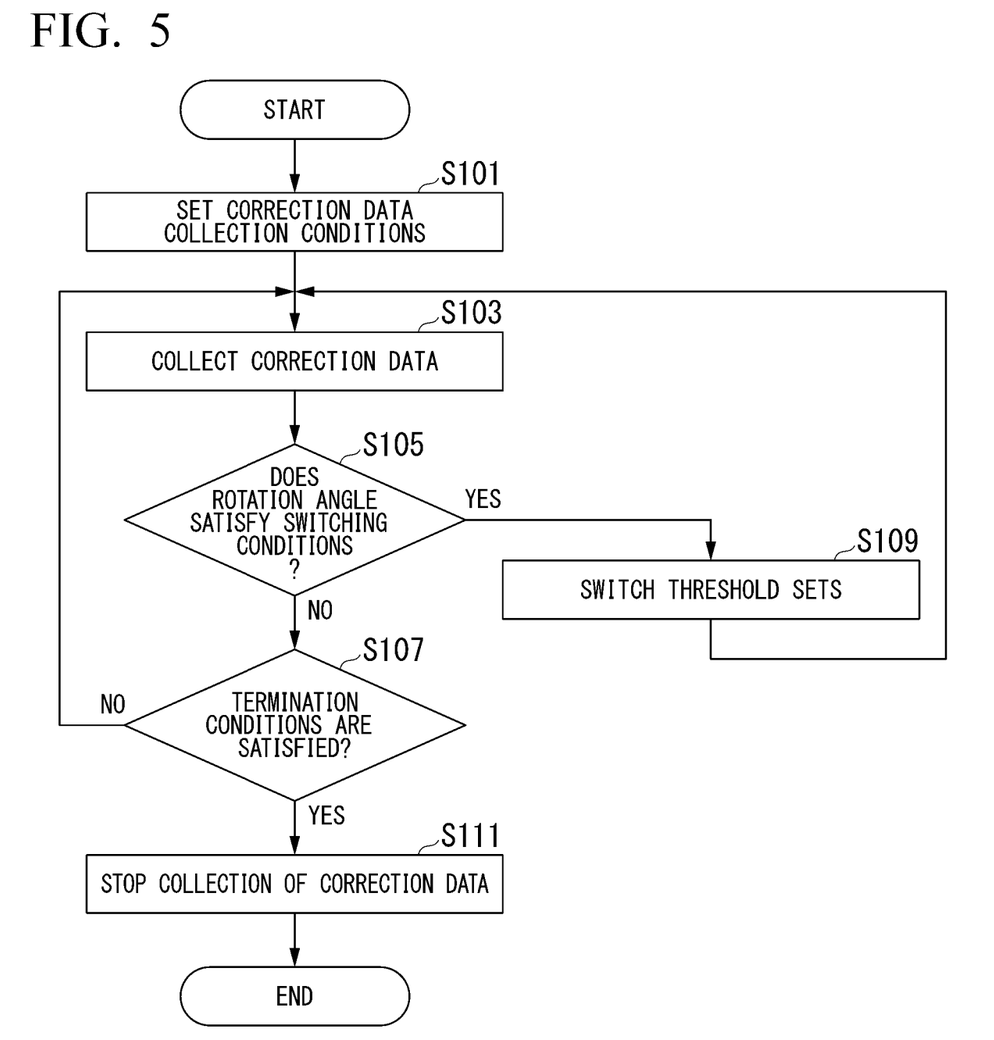
FIG. 5 is a flowchart showing an example of correction data collection processing of the X-ray CT apparatus 1 according to the first embodiment.

Next, an example of correction data collection processing of the X-ray CT apparatus 1 will be described. FIG. 5 is a flowchart showing an example of correction data collection processing of the X-ray CT apparatus 1 according to the first embodiment. The collection processing shown in FIG. 5 is started, for example, when an operator instructs the start of calibration via operation of the input interface provided on the console device 40 or the gantry 10 prior to main scanning of the subject P.

Figure 6:
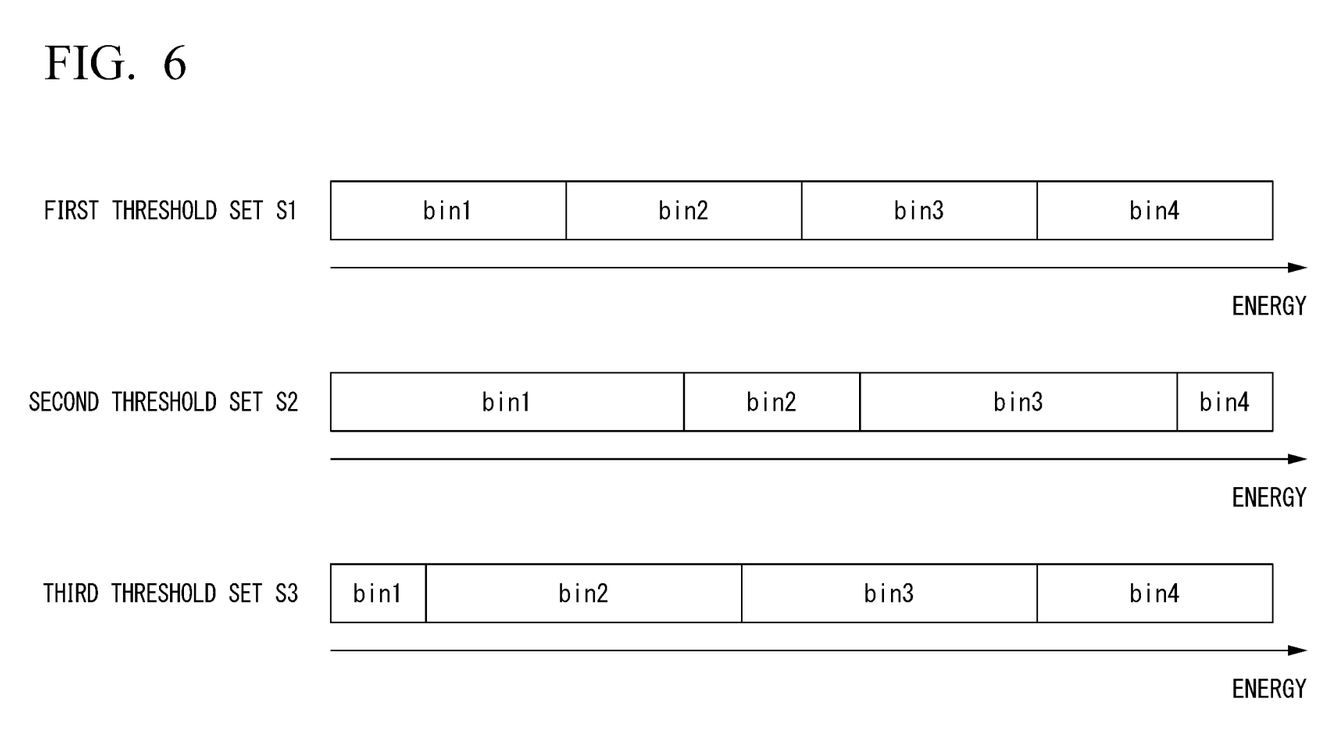
FIG. 6 is a diagram showing an example of correction data collection conditions (threshold set) according to the first embodiment.

First, the collection condition setting function 571 of the correction data collection function 57 of the console device 40 sets correction data collection conditions (threshold set) on the basis of collection conditions stored in advance in the memory 41 or an input operation received by the input interface 43 (step S101). FIG. 6 is a diagram showing an example of correction data collection conditions according to the first embodiment. FIG. 6 shows an example in which three threshold sets, that is, a first threshold set S1, a second threshold set S2, and a third threshold set S3, are set as threshold sets for which correction data is to be acquired. Four energy bins are set for each of the three threshold sets. As the four energy bins, bin1, bin2, bin3, and bin4 are set in order of increasing energy. Combinations of energy bins (ranges of energy bins) set for each of the three threshold sets are at least partially different from each other. Although FIG. 6 shows an example in which four energy bins are set for each of three threshold sets, the number of threshold sets and the number of energy bins are arbitrary.

Figure 7:
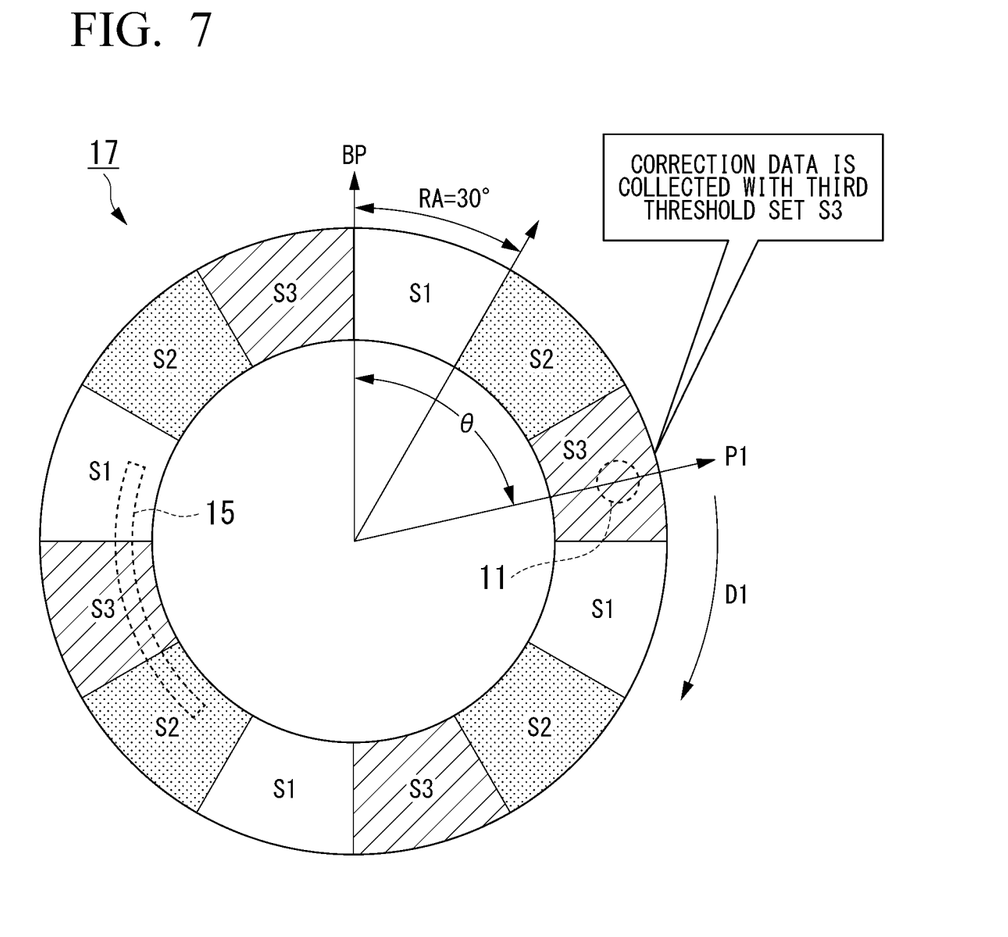
FIG. 7 is a diagram showing an example of correction data collection conditions (allocation of a threshold set for each angle) according to the first embodiment.

FIG. 7 is a diagram showing an example of correction data collection conditions (threshold set allocation for each angle) according to the first embodiment. FIG. 7 shows an example of collecting correction data while sequentially switching three threshold sets in a predetermined unit angular range RA as the rotating frame 17 rotates once. In this example, the unit angular range RA is 30 degrees. The collection conditions are set such that the first threshold set S1, the second threshold set S2, and the third threshold set S3 are switched in order starting from a reference position BP. Although FIG. 7 shows an example in which three threshold sets are allocated during one rotation of the rotating frame 17, threshold sets may be allocated during two or more rotations. For example, if the number of threshold sets for which correction data is to be acquired is large, threshold sets may be allocated over a plurality of rotations.

The collection condition setting function 571 may set imaging parameters such as a focal size, a focal position, a tube voltage, a tube current, a DAS gain, a slit aperture width, and a DAS bundling unit as collection conditions in addition to threshold sets. Further, the collection condition setting function 571 may also set substances (water phantom, air, and other substances) irradiated with X-rays at the time of collecting correction data as the collection conditions in addition to threshold sets.

Referring back to FIG. 5, next, the collection control function 573 controls the control device 18 and the gantry driving device 19 to start collection of correction data (step S103). In the example shown in FIG. 7, the X-ray tube 11 of the rotating frame 17 is positioned at a position P1 (rotation angle θ in direction D1 when the reference position BP is 0 degrees) included in an angle range to which the third threshold set S3 is allocated). At this time, correction data is collected under the condition that the third threshold set S3 is set in the DAS 16 as a correction data collection target.

While correction data is collected under the control of the collection control function 573, the switching function 572 determines whether or not the rotation angle of the rotating frame 17 satisfies threshold set switching conditions (step S105). If the switching function 572 determines that the rotation angle of the rotating frame 17 satisfies the threshold set switching conditions (step S105; YES), the switching function 572 switches threshold sets (step S109). For example, in the example shown in FIG. 7, when the rotating frame 17 further rotates and the rotation angle θ becomes 90 degrees, the switching function 572 determines that the condition for switching from the third threshold set S3 to the first threshold set S1 is satisfied, and switches threshold sets.

That is, the switching function 572 switches between the first energy bin set and the second energy bin set on the basis of collection conditions in which different energy bin sets are allocated to respective preset angles during one rotation of the rotating unit (rotating frame 17). Further, the switching function 572 repeatedly switches between the first energy bin set and the second energy bin set during one rotation of the rotating unit on the basis of collection conditions in which different energy bin sets are allocated to respective preset unit angle ranges during one rotation of the rotating unit.

If imaging parameters such as a focal size, a focal position, a tube voltage, a tube current, a DAS gain, a slit aperture width, and a DAS bundling unit are set as collection conditions in addition to threshold sets, the switching function 572 switches collection conditions defined by combinations of threshold sets and imaging parameters. The collection control function 573 collects correction data with different collection conditions during one rotation of the rotating frame 17 according to switching of the collection conditions.

Further, if collection conditions are set such that threshold sets are allocated over a plurality of rotations, the switching function 572 switches a plurality of energy bin sets while the rotating frame 17 rotates a plurality of times, and the collection control function 573 collects correction data for each of the plurality of energy bin sets during a plurality of rotations in response to switching of the plurality of energy bin sets.

On the other hand, if the switching function 572 determines that the switching conditions are not satisfied (step S105; NO), the collection control function 573 determines whether or not correction data collection termination conditions are satisfied (step S107). The collection control function 573 determines the termination conditions, for example, on the basis of whether or not the rotating frame 17 has rotated once. If the collection control function 573 determines that the correction data collection termination conditions are not satisfied (step S107; NO), the collection control function 573 continues to collect correction data, and processes after step S103 is repeated.

On the other hand, if the collection control function 573 determines that the correction data collection termination conditions are satisfied (step S107; YES), the collection control function 573 stops collecting correction data (step S111). Accordingly, processing of this flowchart ends.

According to the first embodiment described above, it is possible to reduce the time required to collect correction data. Specifically, it is possible to complete collection of correction data corresponding to a plurality of threshold sets during one rotation by switching a threshold set (energy bin set) for each angle while the X-ray tube 11 and the X-ray detector 15 rotate once.

Second Embodiment

Next, a second embodiment will be described. Although a configuration in which threshold sets to be collected are set in advance and correction data is collected has been described in the first embodiment, correction data having a desired energy bin combination is generated by synthesizing a plurality of pieces of collected correction data in the second embodiment. In the following description, components and functions common to those of the first embodiment are denoted by the same reference numerals, and description thereof is omitted.

[Configuration of X-Ray CT Apparatus]

The collection control function 573 of the correction data collection function 57 collects correction data for each threshold set as in the first embodiment, combines the correction data to generate combined correction data, and further generates synthetic correction data having a desired combination of energy bins on the basis of the combined correction data. This combined correction data becomes correction data that is actually used during scanning. The combined correction data and the synthetic correction data are examples of "second correction data" and "third correction data" in the claims. That is, the collection control function 573 combines collected correction data of the first energy bin set and the collected correction data of the second energy bin set to generate the second correction data, and generates the third correction data having a predetermined combination of energy bins on the basis of the generated second correction data. Details of processing of the collection control function 573 will be described later.

[Processing Flow]

Figure 8:
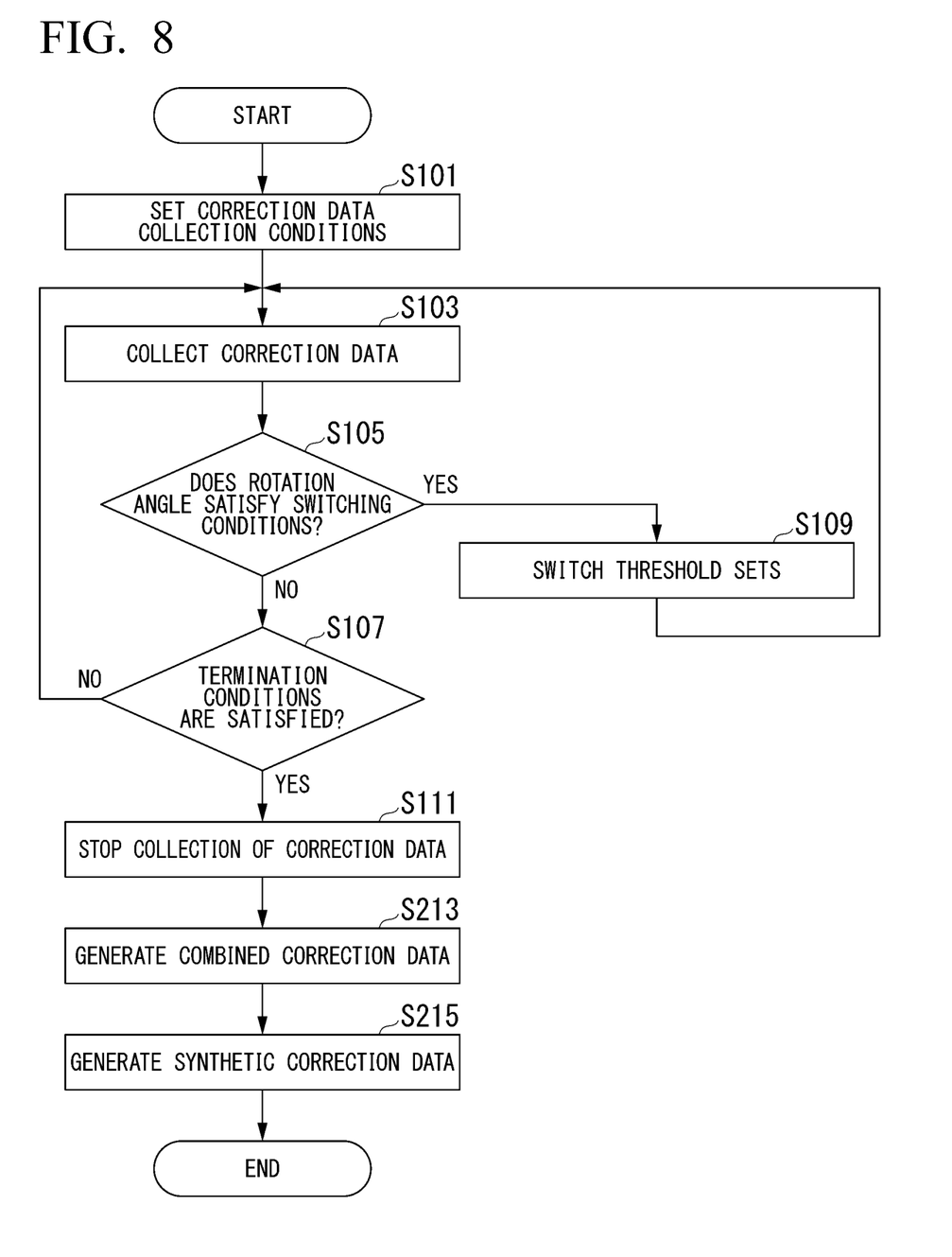
FIG. 8 is a flowchart showing an example of correction data collection processing of an X-ray CT apparatus 1 according to a second embodiment.

Next, an example of correction data collection processing of the X-ray CT apparatus 1 will be described. FIG. 8 is a flowchart showing an example of correction data collection processing of the X-ray CT apparatus 1 according to the second embodiment. The collection processing shown in FIG. 8 is started when an operator instructs the start of calibration via operation of the input interface provided on the console device 40 or the gantry 10, for example, prior to main scanning of the subject P. Here, an example in which there are four levels of thresholds (that is, the DAS 16-1 is provided with four counting channels) according to hardware will be described.

Figure 9:
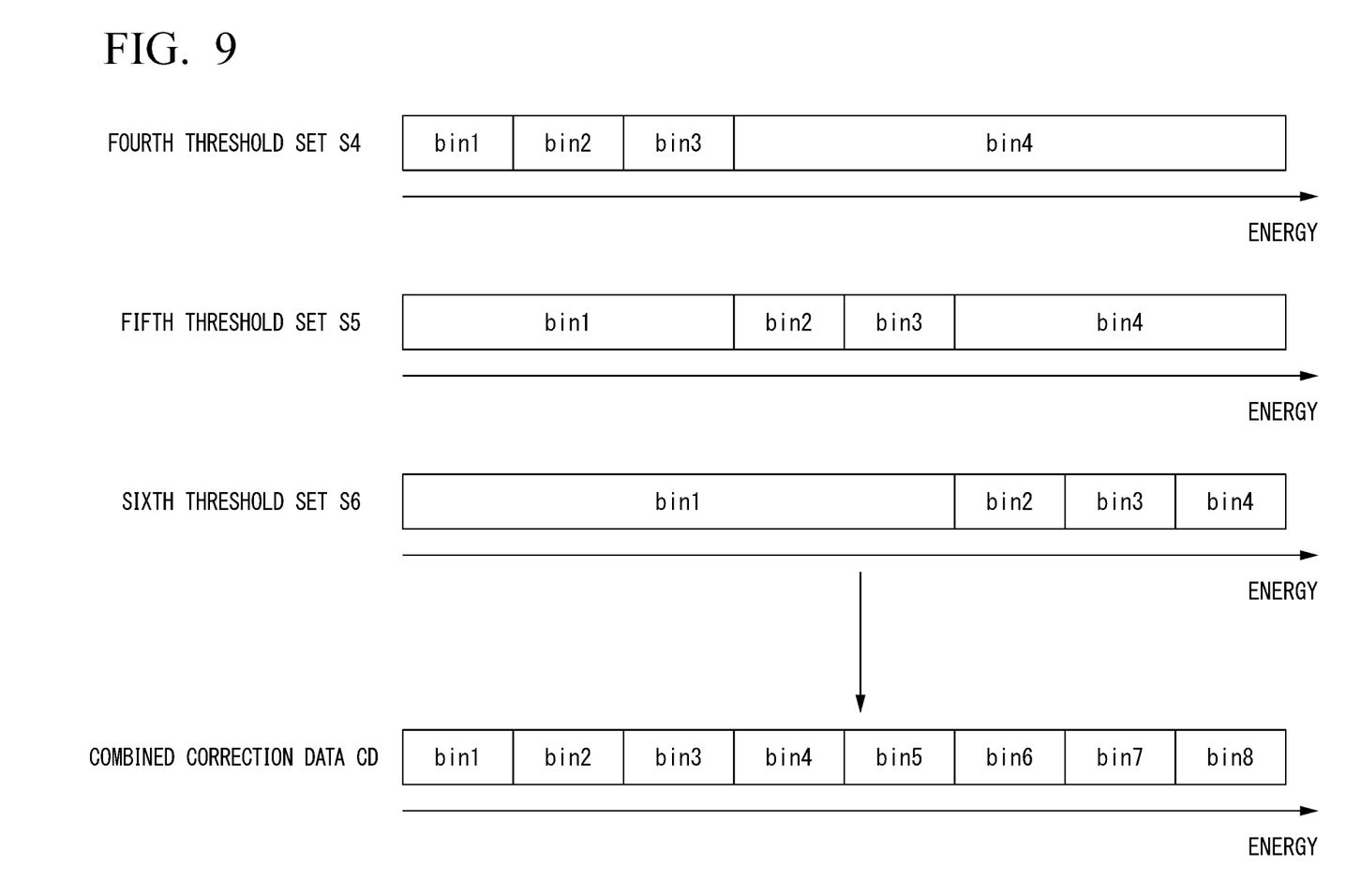
FIG. 9 is a diagram showing an example of correction data collection conditions (threshold set) and combined correction data according to the second embodiment.

First, the collection condition setting function 571 of the correction data collection function 57 of the console device 40 sets correction data collection conditions (threshold sets) on the basis of predetermined collection conditions stored in advance in the memory 41 or an input operation received by the input interface 43 (step S101). FIG. 9 is a diagram showing an example of correction data collection conditions according to the second embodiment. FIG. 9 shows an example in which three threshold sets, a fourth threshold set S4, a fifth threshold set S5, and a sixth threshold set S6, are set. Four energy bins are set for each of the three threshold sets. As the four energy bins, bin1, bin2, bin3, and bin4 are set in order of increasing energy. Combinations of energy bins (ranges of energy bins) set for the three threshold sets are at least partially different from each other.

Next, the collection control function 573 controls the control device 18 and the gantry driving device 19 to start collecting correction data (step S103).

While correction data is collected under the control of the collection control function 573, the switching function 572 determines whether or not the rotation angle of the rotating frame 17 satisfies threshold set switching conditions (step S105). If the switching function 572 determines that the rotation angle of the rotating frame 17 satisfies the threshold set switching conditions (step S105; YES), the switching function 572 switches threshold sets (step S109).

On the other hand, if the switching function 572 determines that the switching conditions are not satisfied (step S105; NO), the collection control function 573 determines whether or not correction data collection termination conditions are satisfied (step S107). If the collection control function 573 determines that the correction data collection termination conditions are not satisfied (step S107; NO), the collection control function 573 continues to collect correction data, and processing after step S103 is repeated. On the other hand, if the collection control function 573 determines that the correction data collection termination conditions are satisfied (step S107; YES), the collection control function 573 stops collection of correction data (step S111).

Next, the collection control function 573 combines collected correction data to generate combined correction data (step S213). In the example shown in FIG. 9, correction data (count data) corresponding to predetermined energy bins is extracted from each piece of correction data collected under the conditions of the three threshold sets (fourth threshold set S4, fifth threshold set S5, and sixth threshold set S6) and combined to generate combined correction data CD. Specifically, correction data for bin1, bin2, and bin3 is extracted from correction data collected under the conditions of the fourth threshold set S4 and set as correction data for bin1, bin2, and bin3 of the combined correction data CD. Further, correction data for bin2 and bin3 is extracted from correction data collected under the conditions of the fifth threshold set S5 and set as correction data for bin4 and bin5 of the combined correction data CD. Further, correction data for bin2, bin3, and bin4 is extracted from correction data collected under the conditions of the sixth threshold set S6 and set as correction data for bin6, bin7, and bin8 of the combined correction data CD. Accordingly, it is possible to obtain combined correction data in which thresholds of energy bins are subdivided.

That is, the collection control function 573 generates the second correction data by combining correction data corresponding to at least one energy bin extracted from the correction data of the first energy bin set and correction data corresponding to at least one energy bin extracted from the correction data of the second energy bin set.

Figure 10A:
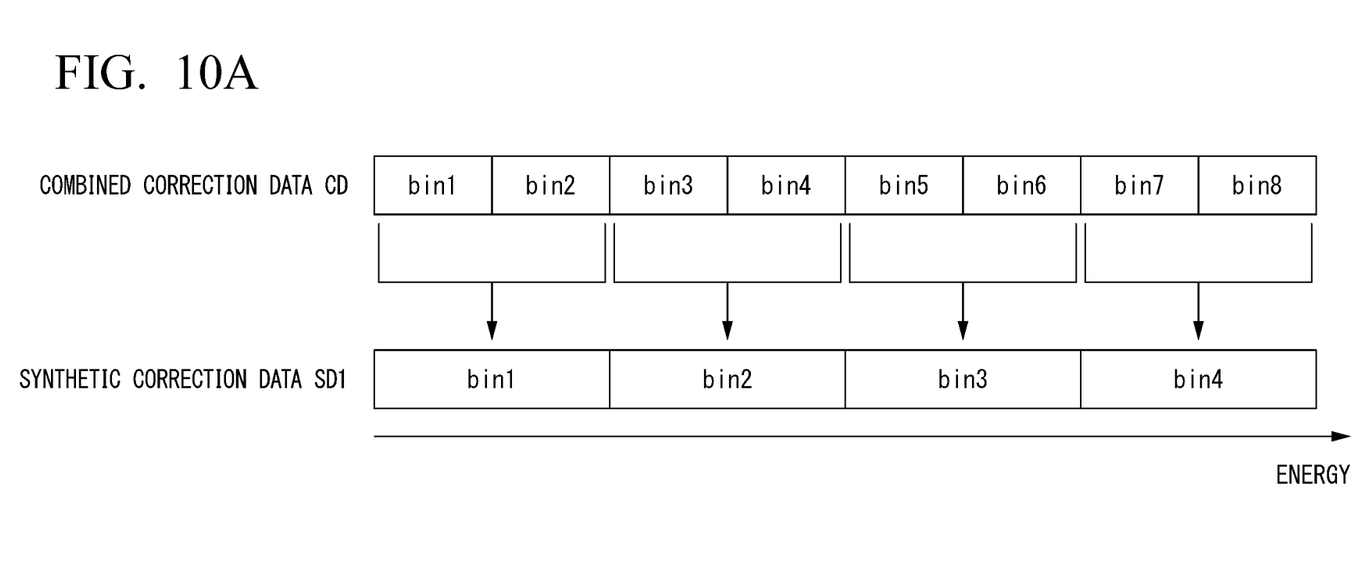
FIG. 10A is a diagram for describing an example of processing of generating synthetic correction data based on combined correction data according to the second embodiment.

Next, the collection control function 573 generates synthetic correction data having a desired combination of energy bins on the basis of the combined correction data (step S215). FIG. 10A is a diagram showing an example of processing of generating synthetic correction data SD1 based on combined correction data CD according to the second embodiment. In the example shown in FIG. 10A, correction data for bin1 and correction data for bin2 included in combined correction data CD are synthesized (the count data is added) and set as correction data for bin1 of the synthetic correction data SD1. Further, correction data for bin3 and correction data for bin4 included in the combined correction data CD are synthesized and set as correction data for bin2 of the synthetic correction data SD1. Further, correction data for bin5 and correction data for bin6 included in the combined correction data CD are synthesized and set as correction data for bin3 of the synthetic correction data SD1. Further, correction data for bin7 and correction data for bin8 included in the combined correction data CD are synthesized and set as correction data for bin4 of the synthetic correction data SD1.

Figure 10B:
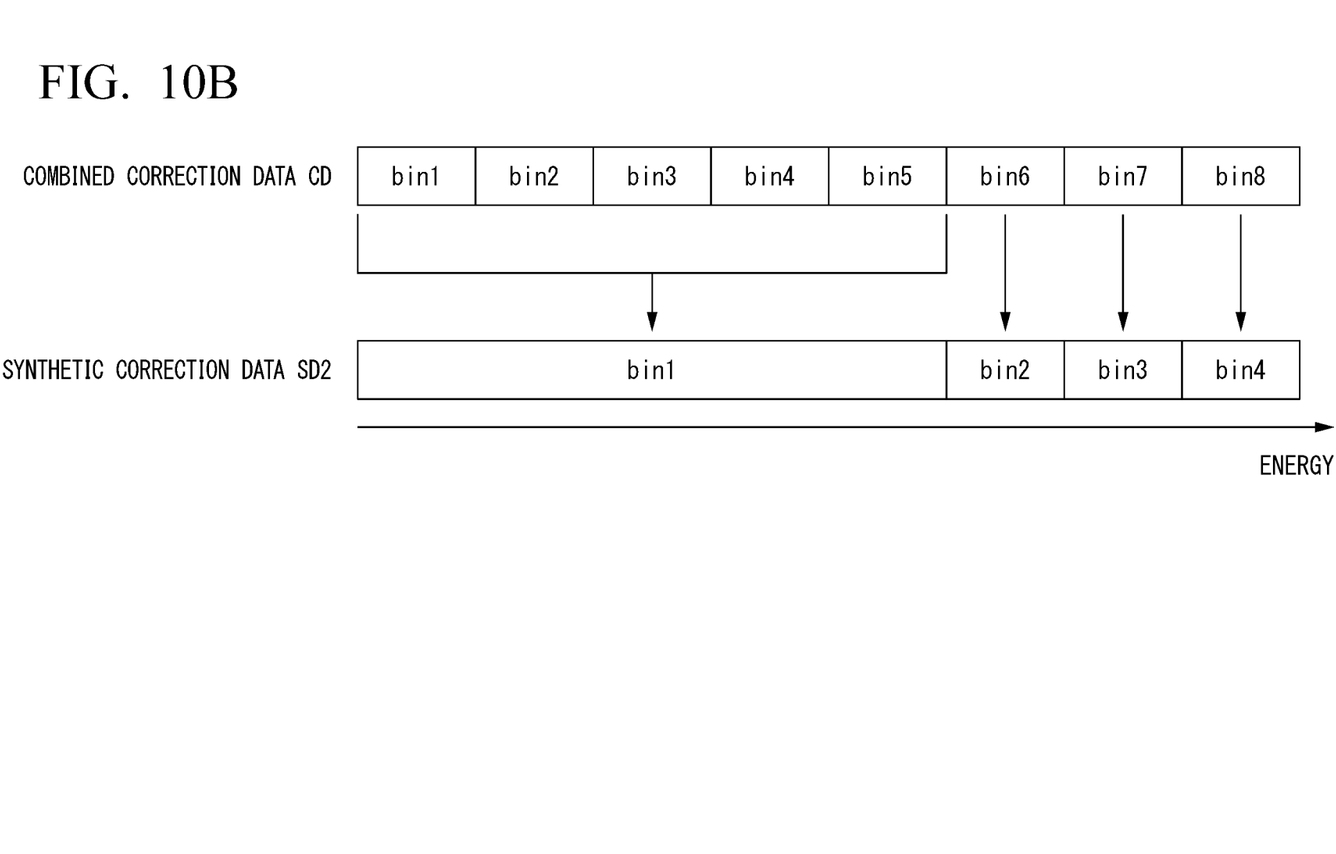
FIG. 10B is a diagram for describing another example of processing of generating synthetic correction data based on combined correction data according to the second embodiment.

FIG. 10B is a diagram showing another example of processing of generating synthetic correction data SD2 based on the combined correction data CD according to the second embodiment. In the example shown in FIG. 10B, the correction data for bin1 to bin5 included in the combined correction data CD are synthesized and set as correction data for bin1 of the synthetic correction data SD2. Further, the correction data for bin6, bin7, and bin8 included in the combined correction data CD are set as correction data for bin2, bin3, and bin4 of the synthetic correction data SD2.

That is, the collection control function 573 generates third correction data including correction data corresponding to an energy bin corresponding to a combination of the first energy bin and the second energy bin by synthesizing the correction data corresponding to the first energy bin and the correction data corresponding to the second energy bin included in the generated second correction data.

In this manner, the collection control function 573 can generate synthetic correction data having a desired combination of energy bins on the basis of combined correction data. Synthetic correction data may be generated each time calibration data is applied to main scan data, or synthetic correction data generated in advance may be stored in the memory 41. Accordingly, the processing of this flowchart ends.

Although an example in which the energy range (the lower limit value of bin1 and the upper limit value of bin4) of each threshold set is the same for a plurality of threshold sets has been described above, the present invention is not limited thereto. For example, threshold sets may be set such that the upper limit value of bin4 of the fourth threshold set S4 is aligned with the lower limit value of bin1 of the sixth threshold set S6. This makes it possible to generate combined correction data CD using only two pieces of correction data of the fourth threshold set S4 and the sixth threshold set S6.

According to the second embodiment described above, it is possible to reduce the time required to collect correction data. Specifically, it is possible to terminate collection of correction data corresponding to a plurality of threshold sets during one rotation by switching threshold sets (energy bin sets) for each angle while the X-ray tube 11 and the X-ray detector 15 rotate once. Further, since synthetic correction data (correction data to be actually used) is generated on the basis of combined correction data in which energy bin thresholds are subdivided, correction data having a desired combination of energy bins can be generated according to a purpose after calibration. For example, even if the number of energy bin thresholds that can be set is limited due to hardware limitations, it is possible to generate correction data in a short period of time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray CT apparatus comprising:
   a rotating unit configured to rotatably hold an X-ray tube and an X-ray detector; and
   processing circuitry configured to:
      switch energy bin sets related to discrimination of photons detected by the X-ray detector between a first energy bin set and a second energy bin set in which at least a part of an energy bin combination is different from the first energy bin set during one rotation of the rotating unit;
      collect correction data for each of the first energy bin set and the second energy bin set during the one rotation in response to switching between the first energy bin set and the second energy bin set;
      generate second correction data by combining the collected correction data of each of the first energy bin set and the second energy bin set; and
      generate third correction data having a predetermined combination of energy bins on the basis of the generated second correction data.

2. The X-ray CT apparatus according to claim 1, wherein the processing circuitry is configured to switch between the first energy bin set and the second energy bin set on the basis of collection conditions in which different energy bin sets are allocated to respective preset angles during the one rotation.

3. The X-ray CT apparatus according to claim 2, wherein the processing circuitry is configured to repeatedly switch between the first energy bin set and the second energy bin set while the rotating unit rotates once on the basis of collection conditions in which different energy bin sets are allocated to respective preset unit angle ranges during the one rotation.

4. The X-ray CT apparatus according to claim 1, wherein the processing circuitry is configured to:
   switch collection conditions defined by combinations of the energy bin sets and imaging parameters of the X-ray CT apparatus; and
   collect the correction data for which the collection conditions are different from each other while the rotating unit rotates once in response to switching of the collection conditions.

5. The X-ray CT apparatus according to claim 1, wherein the processing circuitry is configured to:
   switch a plurality of energy bin sets while the rotating unit rotates a plurality of times; and
   collect the correction data for each of the plurality of energy bin sets during the plurality of rotations in response to switching of the plurality of energy bin sets.

6. The X-ray CT apparatus according to claim 1, wherein the processing circuitry is configured to generate the second correction data by combining correction data corresponding to at least one energy bin extracted from the correction data of the first energy bin set and correction data corresponding to at least one energy bin extracted from the correction data of the second energy bin set.

7. The X-ray CT apparatus according to claim 1, wherein the processing circuitry is configured to generate the third correction data including correction data corresponding to an energy bin corresponding to a combination of the first energy bin and the second energy bin by synthesizing correction data corresponding to the first energy bin and correction data corresponding to the second energy bin included in the generated second correction data.

8. A correction data collection method using a computer of an X-ray CT apparatus including a rotating unit configured to rotatably hold an X-ray tube and an X-ray detector, the correction data collection method comprising:
   switching energy bin sets related to discrimination of photons detected by the X-ray detector between a first energy bin set and a second energy bin set in which at least a part of an energy bin combination is different from the first energy bin set during one rotation of the rotating unit;
   collecting correction data for each of the first energy bin set and the second energy bin set during the one rotation in response to switching between the first energy bin set and the second energy bin set;
   generating second correction data by combining the collected correction data of each of the first energy bin set and the second energy bin set; and
   generating third correction data having a predetermined combination of energy bins on the basis of the generated second correction data.

9. A computer-readable non-transitory storage medium storing a program causing a computer of an X-ray CT apparatus including a rotating unit configured to rotatably hold an X-ray tube and an X-ray detector:
   to switch energy bin sets related to discrimination of photons detected by the X-ray detector between a first energy bin set and a second energy bin set in which at least a part of an energy bin combination is different from the first energy bin set during one rotation of the rotating unit;
   to collect correction data for each of the first energy bin set and the second energy bin set during the one rotation in response to switching between the first energy bin set and the second energy bin set;

to generate second correction data by combining the collected correction data of each of the first energy bin set and the second energy bin set; and to generate third correction data having a predetermined combination of energy bins on the basis of the generated second correction data.

* * * * *